United States Patent
Monge Nunez et al.

(10) Patent No.: US 10,105,617 B2
(45) Date of Patent: Oct. 23, 2018

(54) COGNITIVE MOBILE DEVICE

(71) Applicant: International Business Machines Corporation, Armonk, NY (US)

(72) Inventors: Roxana Monge Nunez, San Jose (CR); Clifford A. Pickover, Yorktown Heights, NY (US); Maja Vukovic, New York, NY (US); Edgar A. Zamora Duran, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 15/270,561

(22) Filed: Sep. 20, 2016

(65) Prior Publication Data

US 2018/0078871 A1   Mar. 22, 2018

(51) Int. Cl.
*A63H 33/00* (2006.01)
*G06N 99/00* (2010.01)
*G08B 21/02* (2006.01)

(52) U.S. Cl.
CPC ......... *A63H 33/006* (2013.01); *G06N 99/005* (2013.01); *G08B 21/0208* (2013.01)

(58) Field of Classification Search
CPC .................................... A63H 33/006
See application file for complete search history.

(56) References Cited

U.S. PATENT DOCUMENTS

| | | |
|---|---|---|
| 6,447,362 B2 | 9/2002 | Khamphilavong et al. |
| 7,762,865 B2 | 7/2010 | Gelfond et al. |
| 2003/0153240 A1 | 8/2003 | DeJule |
| 2007/0058039 A1* | 3/2007 | Clark ................... A63H 33/006 348/143 |
| 2008/0020672 A1 | 1/2008 | Osborn |

(Continued)

FOREIGN PATENT DOCUMENTS

WO     2010025651 A1    3/2010

OTHER PUBLICATIONS

Mell, P., et al., "The NIST Definition of Cloud Computing", NIST Special Publication 800-145, National Institute of Standards and Technology, U.S. Department of Commerce, Sep. 2011, pp. 1-7.

(Continued)

*Primary Examiner* — Gene Kim
*Assistant Examiner* — Alyssa Hylinski
(74) *Attorney, Agent, or Firm* — Scully, Scott, Murphy & Presser, PC; Rahan Uddin, Esq.

(57) ABSTRACT

A method and system for cognitively controlling a mobile having mobile elements controllable by a mobile stimulation pattern. Sensor data is captured from sensors detecting reactions of a baby in proximity to the mobile to a first mobile stimulation pattern and audio/video data is captured from a video camera recording reactions of the baby in proximity to the mobile. The sensor data and the audio/video data are analyzed to determine the behavior of the baby in response to the first mobile stimulation pattern and the determined behavior is compared with expected behaviors of the baby using a machine learning algorithm to learn the baby's reactions to the first mobile stimulation pattern. A second mobile stimulation pattern is selected based on the learning of the baby's reactions to the first mobile stimulation pattern and the mobile is controlled based on the second mobile stimulation pattern.

20 Claims, 5 Drawing Sheets

(56) References Cited

U.S. PATENT DOCUMENTS

| | | | | |
|---|---|---|---|---|
| 2009/0171762 A1* | 7/2009 | Alkove | ........... | G06Q 30/02 705/14.42 |
| 2014/0242872 A1 | 8/2014 | Kim | | |
| 2015/0105608 A1* | 4/2015 | Lipoma | ........... | A61B 5/6896 600/27 |
| 2015/0288877 A1* | 10/2015 | Glazer | ........... | H04N 5/2251 348/77 |
| 2016/0293042 A1* | 10/2016 | Pradeep | ........... | A61B 5/002 |
| 2017/0028309 A1* | 2/2017 | Aizato | ........... | A63H 5/00 |
| 2017/0072162 A1* | 3/2017 | Kim | ........... | A61M 21/02 |

OTHER PUBLICATIONS

Doerrfeld, Bill, "20+ Emotion Recognition APIds That Will Leave you Impressed, and Concerned", http://nordicapis.com/20-emotion-recognition-apis-that-will-leave-you-impressed-and-concerned/, Dec. 31, 2015, pp. 1-22.

Faircloth, Kelly, "The Baby Products Business is Huge, Growing, and Wants Your Money", http://jezebel.comithe-baby-products-business-is-huge-growing-and-wants-1745930936, Dec. 3, 2015, pp. 1-4.

Khazan et al., The Atlantic, "This app Reads your Emotions on Your Face", http://www.theatlantic.com/technology/archive/2014/01/this-app-reads-your-emotions-on-yourr-face/282993/, Jan. 15, 2014, pp. 1-8.

Liberatore, Stacy, "No more guessing what your baby wants: Baby translator app can decode what their crying actually means", http://www.dailymail.co.uk/sciencetech/article-3379113/No-guessing-baby-wants-Baby-translator-app-decode-crying-actually-means.html, Dec. 30, 2015, pp. 1-6.

Chao, et al., An Arduino-Based Resonant Cradle Design with Infant Cries Recognition, Sensors 2015, 15, http://www.mdpi.com/1424-8220/15/8/18934/htm, Aug. 3, 2015, pp. 18934-18949.

Biloop Technolgic, S.L., Cry Translator, http://www.crytranslator.com, Oct. 1, 2013, pp. 1-5.

MonDevices, A Smart Breathing Movement Monitor for Babies with Mobile App, May 16, 2008, https://monbaby.com/, pp. 1-5.

* cited by examiner

COGNITIVE MOBILE DEVICE

BACKGROUND OF THE INVENTION

This disclosure is directed to a cognitive mobile for babies and cohorts and more particularly to a system and method for cognitively controlling a mobile where the mobile learns from interactions with the baby and, based on the learning, the mobile automatically adjusts actions.

A baby mobile is a type of kinetic sculpture constructed to take advantage of the principle of equilibrium. The mobile consists of a number of rods, from which weighted objects or further rods hang. The objects hanging from the rods balance each other, so that the rods remain more or less horizontal. Each rod hangs from only one string, which gives it freedom to rotate about the string. An ensemble of these balanced parts hangs freely in space, by design, without coming into contact with each other. Mobiles are popular in the nursery, where they hang over cribs to give infants entertainment and visual stimulation.

The baby product industry is large and continues growing rapidly. For babies, playing and observing stimulates their senses and helps them learn and develop.

SUMMARY OF THE INVENTION

One embodiment is directed to a method for cognitively controlling a mobile having mobile elements controllable by a mobile stimulation pattern. The method includes capturing sensor data from sensors detecting reactions of a baby in proximity to the mobile to a first mobile stimulation pattern and capturing audio/video data from a video camera recording reactions of the baby in proximity to the mobile to the first mobile stimulation pattern. The method also includes analyzing the sensor data and the audio/video data to determine the behavior of the baby in response to the first mobile stimulation pattern and comparing the determined behavior with expected behaviors of the baby with respect to the first mobile stimulation pattern using a machine learning algorithm to learn the baby's reactions to the first mobile stimulation pattern. The method further includes selecting a second mobile stimulation pattern based on the learning of the baby's reactions to the first mobile stimulation pattern and controlling the mobile based on the second mobile stimulation pattern.

One embodiment is directed to a system having at least one data processor connected to at least one memory that stores computer readable program instructions, where execution of the computer readable program instructions by the at least one data processor causes the system to cognitively control a mobile having mobile elements controllable by a mobile stimulation pattern. The system captures sensor data from sensors detecting reactions of a baby in proximity to the mobile to a first mobile stimulation pattern and captures audio/video data from a video camera recording reactions of the baby in proximity to the mobile to the first mobile stimulation pattern. The system also analyzes the sensor data and the audio/video data to determine the behavior of the baby in response to the first mobile stimulation pattern and compares the determined behavior with expected behaviors of the baby with respect to the first mobile stimulation pattern using a machine learning algorithm to learn the baby's reactions to the first mobile stimulation pattern. The system selects a second mobile stimulation pattern based on the learning of the baby's reactions to the first mobile stimulation pattern and controls the mobile based on the second mobile stimulation pattern.

One embodiment is directed to a computer program product having computer readable program instructions on a non-transitory computer-readable medium, where execution of the computer readable program instructions using a computer causes the computer to cognitively control a mobile having mobile elements controllable by a mobile stimulation pattern. The computer readable program instructions cause the computer to capture sensor data from sensors detecting reactions of a baby in proximity to the mobile to a first mobile stimulation pattern and capture audio/video data from a video camera recording reactions of the baby in proximity to the mobile to the first mobile stimulation pattern. The computer readable program instructions cause the computer to analyze the sensor data and the audio/video data to determine the behavior of the baby in response to the first mobile stimulation pattern and compare the determined behavior with expected behaviors of the baby with respect to the first mobile stimulation pattern using a machine learning algorithm to learn the baby's reactions to the first mobile stimulation pattern. The computer readable program instructions cause the computer to select a second mobile stimulation pattern based on the learning of the baby's reactions to the first mobile stimulation pattern and control the mobile based on the second mobile stimulation pattern.

DETAILED DESCRIPTION OF PREFERRED EMBODIMENTS

A method and system comprising a cognitive mobile system for babies is disclosed. The cognitive mobile learns from interactions with the baby which actions are preferred by the baby, and, based on the learning, the mobile adjusts actions, such as movement, sounds and visuals. The adjustments can be made in real time or at a future time. The mobile system may learn based on cohorts of babies based on various classifications. The classes can include babies with certain problems, conditions, demographics. For examples babies with reflux or colicky babies, developmental delay, vision impaired and other problems can benefit. Thus, one baby can benefit others with the wisdom of the baby crowds.

The adjustments to mobile action may include motions, sounds, visuals, a video feed from a parent, baby-to-baby feed, music, voices, emission of noise, such as white, pink or brown, the projection of calming lights/patterns on the wall, scents, vibrations, speed of rotation of mobile, or other action that may benefit the baby.

Figure 1:
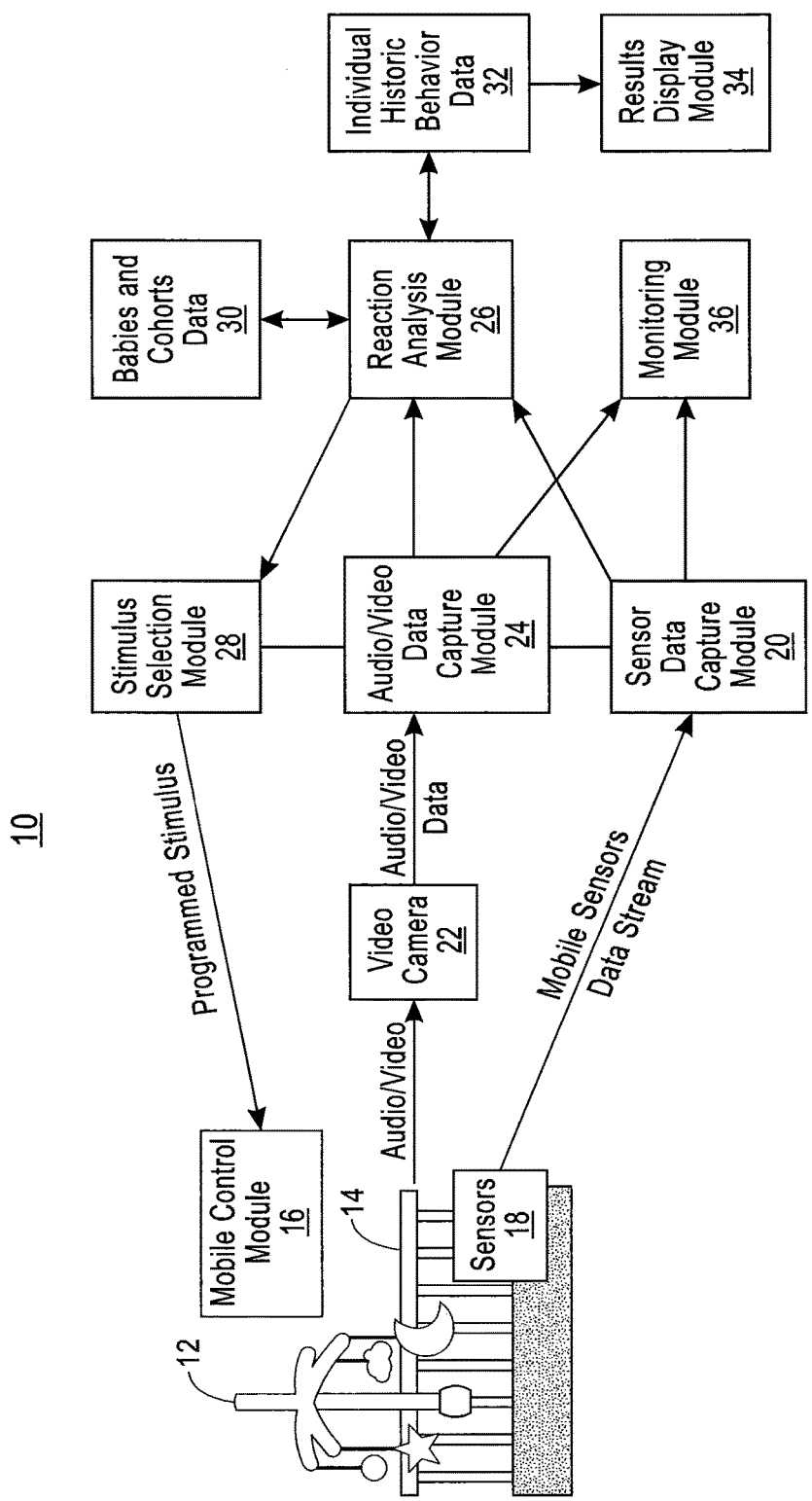
FIG. 1 is a block diagram of a system of cognitively controlling a mobile where the mobile learns from interactions with the baby and, based on the learning, the mobile automatically adjusts actions according to one embodiment of the present disclosure.

FIG. 1 is a block diagram of one embodiment of the cognitive mobile system for babies and cohorts of the present disclosure. FIG. 1 is a more detailed example of the program module 102 of FIG. 5 to be described later. The system 10 obtains sensor data from sensors 18 detecting actions of a baby in proximity to a mobile 12 attached to a bed for a baby, such as crib 14 or other similar baby holder. The system 10 includes a mobile control module 16 for controlling the operation of the mobile 12. The system 10 includes one or more mobile sensors 18 for obtaining sensor data based on the actions of the baby. The sensors include devices that can detect various actions of the baby such as motions, sounds, biometrics and heart rate. The data streams from the various sensors are transmitted to a sensor data capture module 20. The sensor data collection module 20 collects and/or captures the real-time data transmitted by the plurality of sensors. Sensor data capture module 20 captures, time, date, sensors readouts. The system 10 also includes a camera 22 that captures audio and video data of the baby's movements and sound and transmits the audio/video data to an audio/video data capture module 24. The a/v data capture module 24 determines facial expressions via face recognition, gestures via gesture recognition and other data from video analytics performed on the a/v data.

The system 10 includes a reaction analysis module 26 that analyzes the data collected from the databases 20 and 24 during a stimulation session in which the actions of the mobile are operated in a controlled manner. The reaction analysis module 26 determines the behavior of the baby and transmits the analysis results to a stimulus selection module 28. In one embodiment, the reaction analysis module 26 compares the expected behavior for babies and cohorts with similar profile (age, condition, culture, gender) stored in database 30 with respect to the behavior determined from the captured data from modules 20 and 24 using a machine learning algorithm known in the art.

Figure 2:
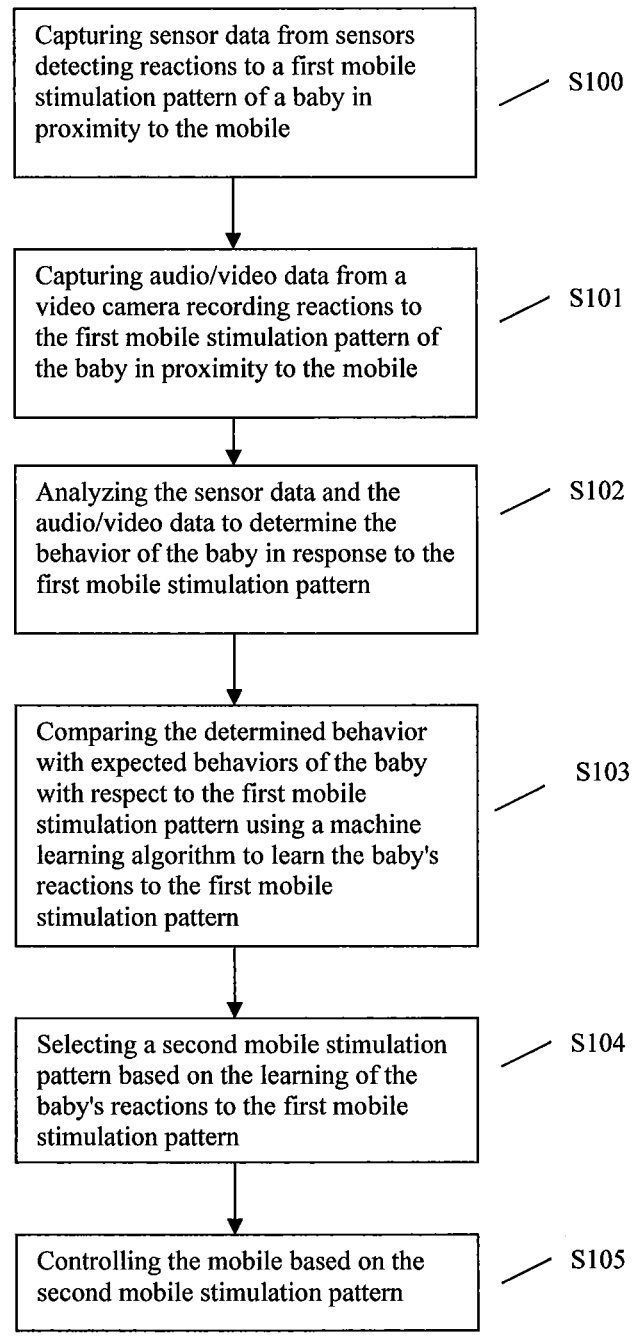
FIG. 2 is flow diagram of one embodiment of the method of cognitively controlling a mobile.

The system 10 in one embodiment performs a method for cognitively controlling a mobile having mobile elements controllable by a mobile stimulation pattern. The method, as shown in FIG. 2, includes step S100 capturing sensor data from sensors detecting reactions to a first mobile stimulation pattern of a baby in proximity to the mobile and step S101 capturing audio/video data from a video camera recording reactions to the first mobile stimulation pattern of the baby in proximity to the mobile. The method also includes step S102 analyzing the sensor data and the audio/video data to determine the behavior of the baby in response to the first mobile stimulation pattern and step S103 comparing the determined behavior with expected behaviors of the baby with respect to the first mobile stimulation pattern using a machine learning algorithm to learn the baby's reactions to the first mobile stimulation pattern. The method further includes step S104 selecting a second mobile stimulation pattern based on the learning of the baby's reactions to the first mobile stimulation pattern and step S105 controlling the mobile based on the second mobile stimulation pattern. Step S103 may further include comparing the determined behavior with expected behaviors of cohorts of the baby with respect to the first mobile stimulation pattern using a machine learning algorithm to learn the baby's reactions to the first mobile stimulation pattern. The second mobile stimulation pattern selected in step S104 may be generated by adjusting the mobile element actions of the first stimulation pattern, the adjustments including one or more of motions, sounds, visuals, a video feed from a parent, baby-to-baby feed, music, voices, emission of noise, the projection of calming lights and patterns on the wall, scents, vibrations, speed of rotation of the mobile elements.

Referring again to FIG. 1, the cognitive mobile system 10 is thus interactive as it responds to various sensed aspects, such as sound, light, or gestures via gesture recognition, learns from these interactions with the baby and, based on the learning, the mobile adjusts actions, such as movement, sounds and visuals.

The reaction analysis module 26 may, among other things, schedule more stimulation sessions to aid the baby in entering a desirable behavioral state, vary the type of stimulus to improve the behavior in one specific area, change the level of stimulus given a exceeding performance on a behavior and identify symptoms related to disorders in the motor and cognitive skills of a baby. The reaction analysis module 26 stores baby personal data in an individual historic behavior database 32 for future analysis and reporting purposes. Parents and caregivers may provide additional information to database 32 if this information helps their baby and the babies of others.

The stimulus selection module 28 selects a stimulus and its expected behavior from the babies and cohorts database 30 according to a baby profile stored in the database and sends it to the mobile control module 16. The control module 16 starts a stimulation session according to the selected stimulus. The stimulation session enables the data capture that is passed to the reaction analysis module 26 which then stores the results of the analysis in the historic and behavioral database 32. A results display module 34 generates a report in a form to be presented to the parents, doctors, caregivers, or other authorized parties on a display.

The actions controlled by the selected stimulus include any of the actions the mobile is capable of performing, such as movement of the mobile elements, sounds and visuals. In one embodiment, small video screens may be used in the mobile to provide one or more of the above actions. For example, the mobile system may include thin, flexible displays such as organic light emitting diode (OLED) displays. The OLED displays are coupled to the control module 16.

In one embodiment, the video capture module 24 and the sensor data capture module 20 serve as the inputs to a baby monitoring module 36. The monitoring module 36 may provide alerts regarding the baby that may require action by the parent, caregiver or healthcare professional.

In one embodiment, the display adapts the type of patterns that are shown to the baby over time. In the early days, the baby recognizes black/white patterns. Over time, the display and/or surface of the mobile elements that are attached to the mobile system may change, as the system learns what patterns grab babies' attention.

The cognitive mobile system of this disclosure will help parents have a better understanding of babies' behavior through time. Also, doctors and healthcare professionals can use the information from the cognitive mobile to assess baby's condition or development.

The reaction analysis module 26 may use various approaches for estimating a cognitive state or mood of a baby, with a confidence level. These methods can be based on vocal stress and cries or facial expressions, when possible. In one embodiment, the mobile system incorporates a mobile app having face-tracking technology which allows computers to read facial expressions for providing an emotion assessment of the baby. Examples of facial-tracking apps that may used in the mobile system may be found at: http://www.theatlantic.com/technology/archive/2014/01/this-app-reads-your-emotions-on-your-face/282993/ and http://nordicapis.com/20-emotion-recognition-apis-that-will-leave-you-impressed-and-concerned/.

In addition, since babies do sometimes communicate through crying, analysis of such cries, such as being studied by the developers of the app http://www.crytranslator.com/en/, can be used for learning baby's condition or behavior, with confidence level C, such as sleep, boredom, hunger, discomfort, stress. Developers of cry-translator suggest that babies often "communicate their feelings through cries that differ in the pattern of the pitch, loudness, tone and inflection. For example, a stressed cry has a strong, short attack, falls slowly and then rises again, whereas a hungry cry is high-pitched and energetic.

Every baby has a unique accent and tone, and the Cry Translator uses a technology that does not just rely on a cry's tone or pitch, but matches it with an established pattern to get the translation." Research has shown that baby cries can be used to control a cradle. Chao, et al. An Arduino-Based Resonant Cradle Design with Infant Cries Recognition. Sensors 2015, 15(8), 18934-18949.

Recently, researchers collected 200,000 crying sounds from 100 newborn babies. A "translator" can tell you if baby is hungry, tired, in pain and has wet diaper, etc. This takes 15 seconds of the app listening to crying to an make analysis. Researchers claim 92% accurate in infants under 2 weeks and 85% under 2 months. http://www.dailymail.co.uk/sciencetech/article-3379113/No-guessing-baby-wants-Baby-translator-app-decode-crying-actually-means.html.

The reaction analysis module 26 incorporates known machine learning algorithms to analyze the data from one or more of the above described or other existing approaches for learning the cognitive state of the baby and based on learned information, the reaction analysis module 26 and the stimulus selection module 28 adjusts actions of the mobile that calm or entertain the baby. The cognitive mobile system 10 learns how the baby reacts to each action that it performs to meet various purposes such as to reduce the baby's energy, encourage the baby's curiosity or relax the baby. In addition, mobile may be adjusted to perform actions to improve the baby's skills, such as communication and movements. The continued cognitive learning improves effectiveness of the mobile system over time.

Babies try to communicate by babbling and in one embodiment, the cognitive mobile system learns the baby's sounds, then adjusts actions to keep the baby improving in terms of vocal output, apparent contentment, etc. For example, babies babble syllables and by learning these symbols or phonemes, the cognitive mobile system can identify possible words and play an optimal word sound, such as if the baby babbles "da", the mobile plays the word "Dad" or "Daddy." In one embodiment, parents could record their voices for this purpose.

Referring again to FIG. 2, step 100 may include ambient variables to help in shaping output from the cognitive mobile system, including any of: temperature of the room, non-baby noises in the room, non-baby movements of things or people in the room, humidity, room lighting, time of day, and a history of such parameters for the previous N minutes.

In one embodiment, one part of the mobile may be fixed on a crib or ceiling. An object holding portion is coupled to the body module and is equipped with one or more objects attracting the attention of a baby. The mobile can be mounted on a crib and include a central operating unit (CPU) including an interface component adapted to electronically interface with a portable music player. The CPU incorporates software, also referred to herein as computer readable program instructions for performing the functions of the data capture modules 20 and 24, the reaction analysis module 26 and stimulus selection module 28. A speaker is operatively coupled to the CPU. A visual stimulation device is operatively coupled to the CPU and presents a visual stimulus above the baby crib. An attachment bracket is coupled to the CPU and is adapted to mount the central operating unit to the baby crib. The visual stimulation device may be in the form of a mobile, a projector or a side panel display. The interface component may be in the form of a docking station, a USB port or other type of port. The CPU may be powered by AC current, by batteries or other power means.

In one embodiment, the cognitive mobile system employs a rotating musical remote control baby mobile device. If desired, the baby mobile device has a base attached to a crib or piece of furniture. The device also includes a music box, an extending arm and rotatable bar attached to the arm. The mobile has several figures that can be provided by OLED video or they can be simpler, and can be removed from the mobile using snap hooks or hook and loop fasteners. These individual figures can be safely given to an infant or newborn for holding or teething.

In some embodiments, the cognitive mobile system can be integrated within a smart home, Internet of Things and/or cloud computing. In some embodiments, the signals to control the mobile system may come from a remote server or the cloud. In some embodiments, images or sounds of the baby may not need to leave the local unit or local processing. Parents may be willing to provide certain information ("my baby is colicky and vision impaired") so as to help provide the baby with a more useful mobile.

In one embodiment, multiple cognitive mobiles such as in nurseries with more than one baby, are arranged to collaborate to share information. Individual babies develop their own personalities and preferences. Cognitive mobile systems that are collocated in the same room (adjacent cribs) or on the same crib are equipped with the a reasoning engine within the reaction analysis module 26 that helps them adapt based on the condition of all the babies present. For example, a mobile may quiet down and roll a bit slower so as to calm the energetic baby, if the others are sleeping or fussy. Mobiles collaborate and adapt their behavior to optimize the effect on preserving a happy and calm environment for all the babies.

In one embodiment in which there is more than one baby interacting with the a single mobile or multiple mobiles, parents may optionally set up an identification device on the monitoring system such as little chip in their clothing or any other device. This will allow more accurate learning and an optimal functionality of the mobiles, since it will recognize how to calm the energetic baby who is waking up or in some slight distress that may occasionally be calmed. Such a system can also provide soothing stimulation to aid in baby development. Also, the system may learn how the baby's interaction is with other babies. Also, this kind of monitoring system can provide inputs for learning a baby's behavior. For example, the mobile can be adapted to calm the baby when the nursery temperature is moving higher and the baby have a history of becoming agitated when the temperature is slightly high.

In one embodiment, neighboring mobiles may perform certain actions to attract the attention and/or develop curiosity of the adjacent baby. The cognitive mobile systems may learn if an action is encouraging a baby's curiosity or not, based on the baby interaction, along with the various inputs that the monitoring system provides. A baby's laughing and movements may be inputs which the reaction analysis module 26 identifies the baby's curiosity. One example of a monitoring system that can be used within the cognitive mobile system of this disclosure may be found at https://monbaby.com/#features, which describes a monitoring system that involves sleep position, proximity alarms, real-time stats and sleep cycles, breathing movements, fall detection, and various forms of proactive monitoring.

In one example, a baby Bob is crying because the baby is determined to be tired, with confidence level 90%. The stimulus selection module 28 selects a stimulus that causes the control module 16 to display pattern A and sound sequence B, as determined by the reaction analysis module 26 to be most effective for 100 babies in a similar cohort as Bob. The reaction analysis module 26 determines that by employing pattern A and sound sequence B that the current baby Bob falls asleep within 3 minutes, with a happy expression and "calm" heart rate. This information is recorded for Bob. Also, information regarding Bob may enter the databases 30 and 32 to help other babies, Joe, Alice, and Patricia who are in a similar cohort.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 3:
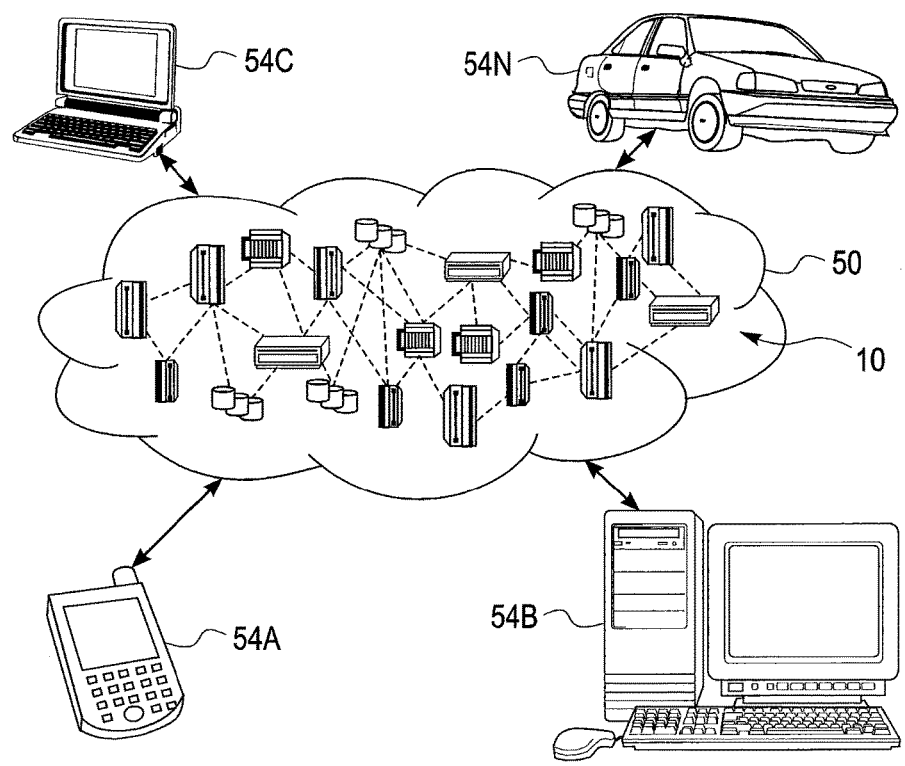
FIG. 3 depicts a cloud computing environment according to an embodiment of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 4:
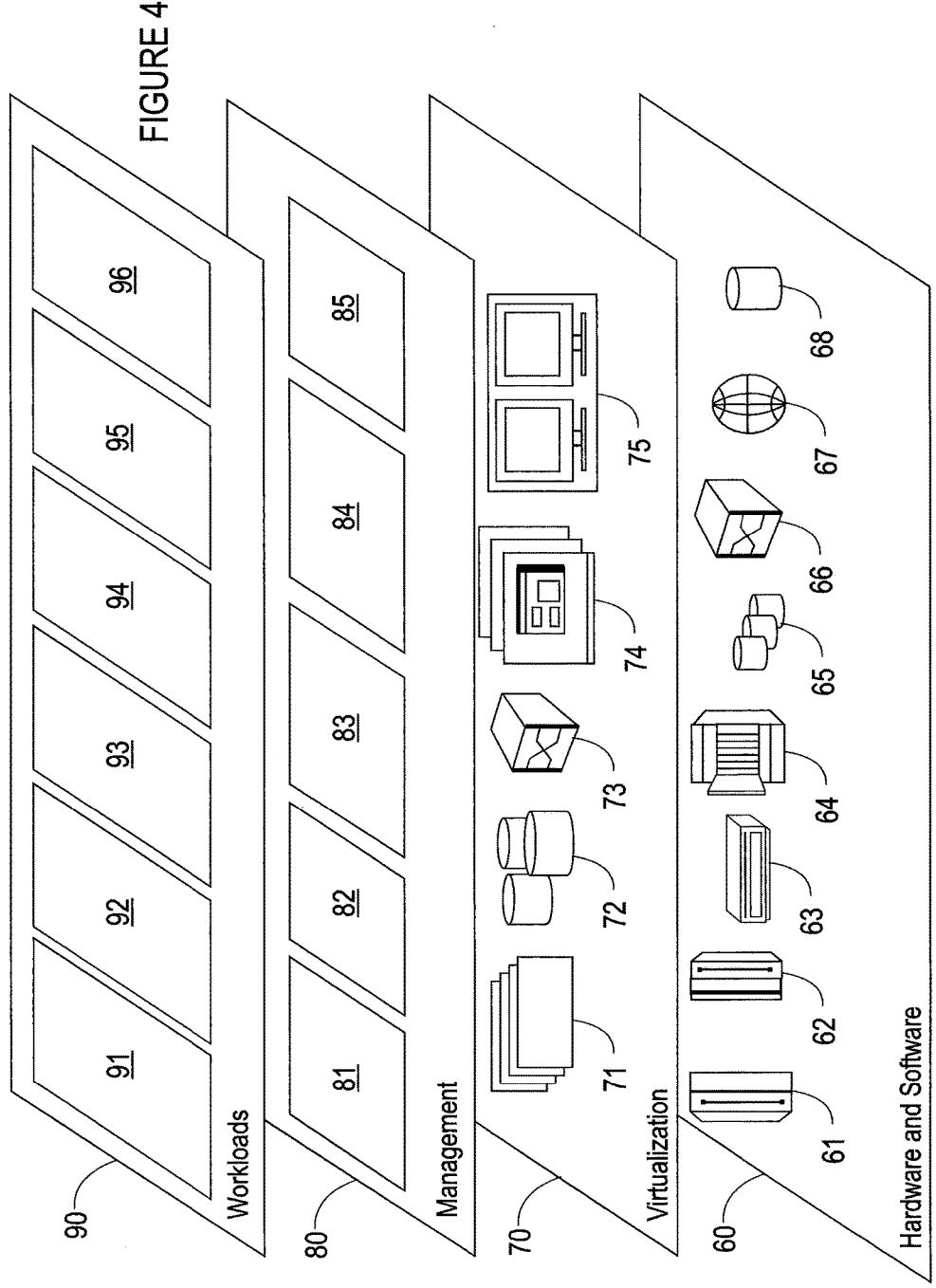
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitively controlling a mobile 96.

Figure 5:
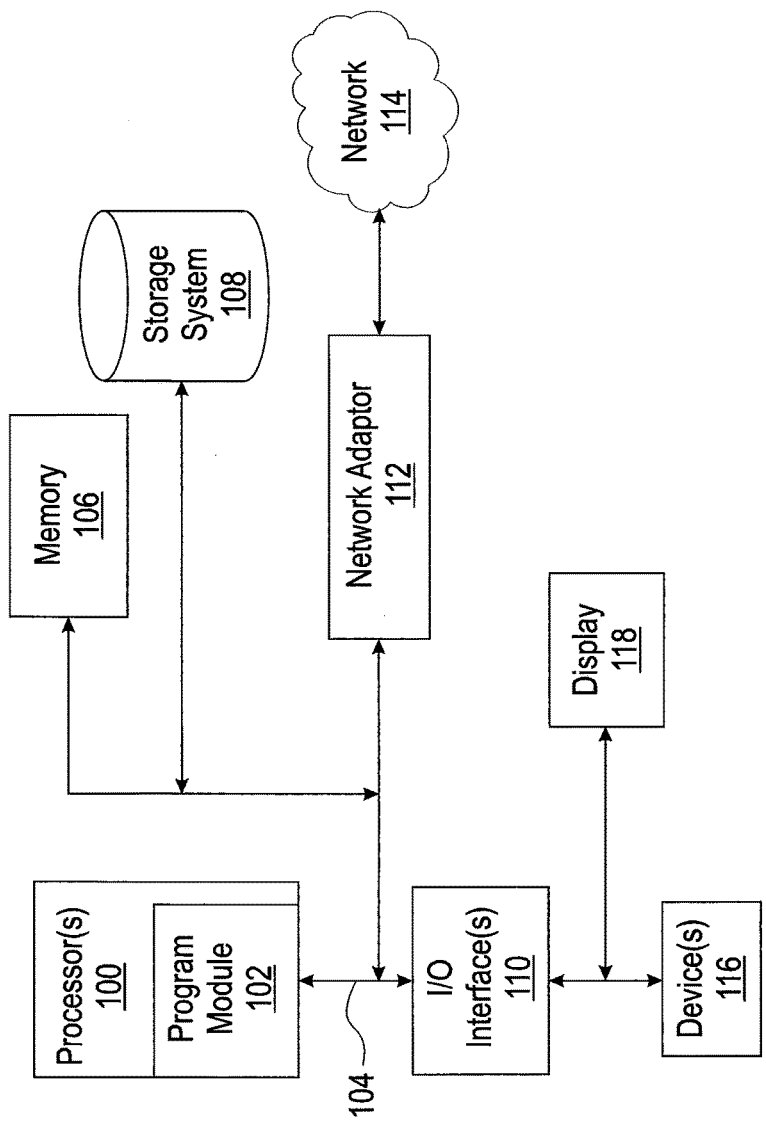
FIG. 5 is a block diagram of an exemplary computing system suitable for implementation of the embodiments of the invention disclosed in this specification.

FIG. 5 illustrates a schematic of an example computer or processing system that may implement the method for cognitively controlling a mobile in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for cognitively controlling a mobile having mobile elements, the actions of the mobile elements being controllable by a mobile stimulation pattern, the method comprising:
   capturing sensor data from sensors detecting reactions of a baby in proximity to the mobile to a first mobile stimulation pattern;
   capturing audio/video data from a video camera recording reactions of the baby in proximity to the mobile to the first mobile stimulation pattern;
   analyzing the sensor data and the audio/video data to determine the behavior of the baby in response to the first mobile stimulation pattern;
   storing a profile of the baby in a computer storage, the profile comprising data classifying the baby in at least one classification, the at least one classification being selected from the group consisting of behavior problems, medical conditions and demographics;
   comparing the determined behavior with expected behaviors of the baby with respect to the first mobile stimulation pattern using a machine learning algorithm to determine a first learned baby's reactions to the first mobile stimulation pattern;
   comparing the determined behavior with expected behaviors of cohorts of the baby having a profile containing at least one classification the same as the baby, with respect to the first mobile stimulation pattern using a machine learning algorithm to determine a second learned baby's reactions to the first mobile stimulation pattern;
   adjusting the actions of one or more of the mobile elements based on the first and second learned baby's reactions to the first mobile stimulation pattern.

2. The computer implemented method of claim 1 further including storing historical data of the learned baby's reactions to multiple mobile stimulation patterns over time, and analyzing the historical data to determine changes in the baby's behavior over time.

3. The computer implemented method of claim 1 further comprising generating a second mobile stimulation pattern based on adjusting the mobile element actions of the first stimulation pattern, the adjustments including one or more of motions, sounds, visuals, a video feed from a parent, baby-to-baby feed, music, voices, emission of noise, the projection of calming lights and patterns on the wall, scents, vibrations, speed of rotation of the mobile elements.

4. The computer implemented method of claim 1 further comprising adjusting in real time the actions of one or more of the mobile elements based on the first and second learned baby's reactions to the first mobile stimulation pattern.

5. The computer implemented method of claim 1 wherein the audio/video data includes one or more of facial expressions and gestures and the capturing includes performing video analytics on the audio/video data and the computer implemented method further includes inputting the audio/video data and the sensor data to a baby monitoring system and provide alerts regarding the baby that may require action.

6. The computer implemented method of claim 1, provided as a service in a cloud environment.

7. The computer implemented method of claim 1 further including capturing ambient data, wherein the ambient data is selected from the group consisting of room temperature, non-baby noises in the room, non-baby movements of things or people in the room, room humidity, room lighting, time of day, and determining the behavior of the baby in response to the captured ambient data.

8. A system comprising:
   at least one data processor connected to at least one memory that stores computer readable program instructions, where execution of the computer readable program instructions by the at least one data processor causes the system to cognitively control a mobile having mobile elements, the actions of the mobile elements being controllable by a mobile stimulation pattern by:
   capturing sensor data from sensors detecting reactions of a baby in proximity to the mobile to a first mobile stimulation pattern;
   capturing audio/video data from a video camera recording reactions of the baby in proximity to the mobile to the first mobile stimulation pattern;
   analyzing the sensor data and the audio/video data to determine the behavior of the baby in response to the first mobile stimulation pattern;
   storing a profile of the baby in a computer storage, the profile comprising data classifying the baby in at least one classification, the at least one classification being selected from the group consisting of behavior problems, medical conditions and demographics;
   comparing the determined behavior with expected behaviors of the baby with respect to the first mobile stimulation pattern using a machine learning algorithm to determine a first learned baby's reactions to the first mobile stimulation pattern;
   comparing the determined behavior with expected behaviors of cohorts of the baby having a profile containing at least one classification the same as the baby, with respect to the first mobile stimulation pattern using a machine learning algorithm to determine a second learned baby's reactions to the first mobile stimulation pattern;
adjusting the actions of one or more of the mobile elements based on the first and second learned baby's reactions to the first mobile stimulation pattern.

9. The system of claim 8 wherein the computer readable program instructions further cause the computer store historical data of the learned baby's reactions to multiple mobile stimulation patterns over time, and analyze the historical data to determine changes in the baby's behavior over time.

10. The system of claim 8 further comprising generating a second mobile stimulation pattern based on adjusting the mobile element actions of the first stimulation pattern, the adjustments including one or more of motions, sounds, visuals, a video feed from a parent, baby-to-baby feed, music, voices, emission of noise, the projection of calming lights and patterns on the wall, scents, vibrations, speed of rotation of the mobile elements.

11. The system of claim 8 further comprising adjusting in real time the actions of one or more of the mobile elements based on the first and second learned baby's reactions to the first mobile stimulation pattern.

12. The system of claim 8 wherein the audio/video data includes one or more of facial expressions and gestures and the capturing includes performing video analytics on the audio/video data.

13. The system of claim 8 further including inputting the audio/video data and the sensor data to a baby monitoring system and provide alerts regarding the baby that may require action.

14. The system of claim 8 wherein the computer readable program instructions further cause the computer to capture ambient data including one or more of room temperature, non-baby noises in the room, non-baby movements of things or people in the room, room humidity, room lighting, time of day and determine the behavior of the baby in response to the captured ambient data.

15. A computer program product comprising:
computer readable program instructions embodied on a computer-readable storage medium, where execution of the computer readable program instructions using a computer causes the computer to cognitively control a mobile having mobile elements, the actions of the mobile elements being controllable by a mobile stimulation pattern by:
capturing sensor data from sensors detecting reactions of a baby in proximity to the mobile to a first mobile stimulation pattern;
capturing audio/video data from a video camera recording reactions of the baby in proximity to the mobile to the first mobile stimulation pattern;
analyzing the sensor data and the audio/video data to determine the behavior of the baby in response to the first mobile stimulation pattern;
storing a profile of the baby in a computer storage, the profile comprising data classifying the baby in at least one classification, the at least one classification being selected from the group consisting of behavior problems, medical conditions and demographics;
comparing the determined behavior with expected behaviors of the baby with respect to the first mobile stimulation pattern using a machine learning algorithm to determine a first learned baby's reactions to the first mobile stimulation pattern;
comparing the determined behavior with expected behaviors of cohorts of the baby having a profile containing at least one classification the same as the baby, with respect to the first mobile stimulation pattern using a machine learning algorithm to determine a second learned baby's reactions to the first mobile stimulation pattern;
adjusting the actions of one or more of the mobile elements based on the first and second learned baby's reactions to the first mobile stimulation pattern.

16. The computer program product of claim 15 wherein the computer readable program instructions further cause the computer to store historical data of the learned baby's reactions to multiple mobile stimulation patterns over time, and analyze the historical data to determine changes in the baby's behavior over time.

17. The computer program product of claim 15 further comprising generating a second mobile stimulation pattern based on by adjusting the mobile element actions of the first stimulation pattern, the adjustments including one or more of motions, sounds, visuals, a video feed from a parent, baby-to-baby feed, music, voices, emission of noise, the projection of calming lights and patterns on the wall, scents, vibrations, speed of rotation of the mobile elements.

18. The computer program product of claim 15 further comprising adjusting in real time the actions of one or more of the mobile elements based on the first and second learned baby's reactions to the first mobile stimulation.

19. The computer program product of claim 15 further including inputting the audio/video data and the sensor data to a baby monitoring system and provide alerts regarding the baby that may require action.

20. The computer program product of claim 15 wherein the computer readable program instructions further cause the computer to capture ambient data including one or more of room temperature, non-baby noises in the room, non-baby movements of things or people in the room, room humidity, room lighting, time of day and determine the behavior of the baby in response to the captured ambient data.

* * * * *